Jan. 2, 1951   J. P. JAKOB   2,536,060
FISH CANNING MACHINE
Filed Sept. 11, 1945   4 Sheets-Sheet 1
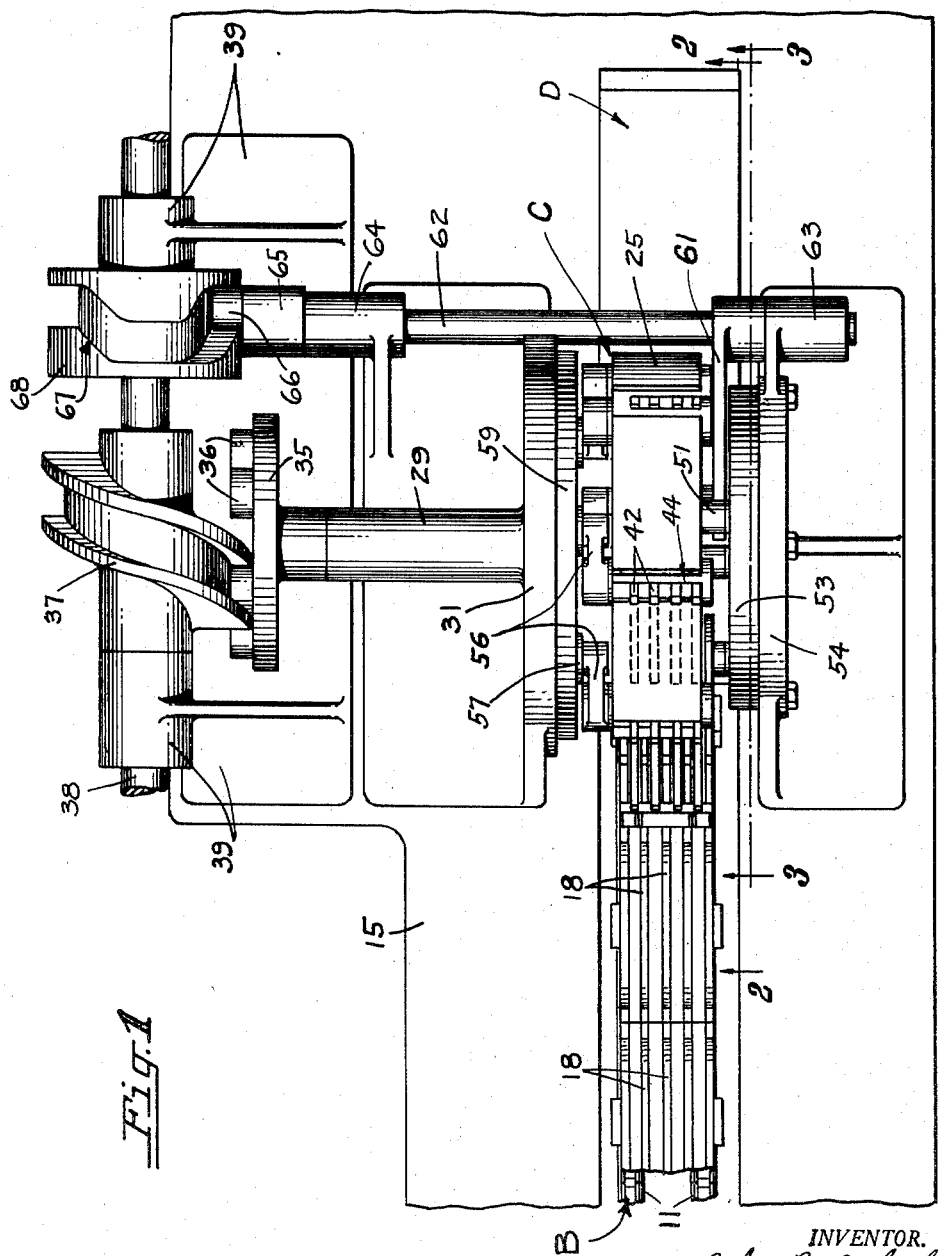
INVENTOR.
John P. Jakob
BY Ivan D. Thornburgh
Charles H. Erne
ATTORNEYS

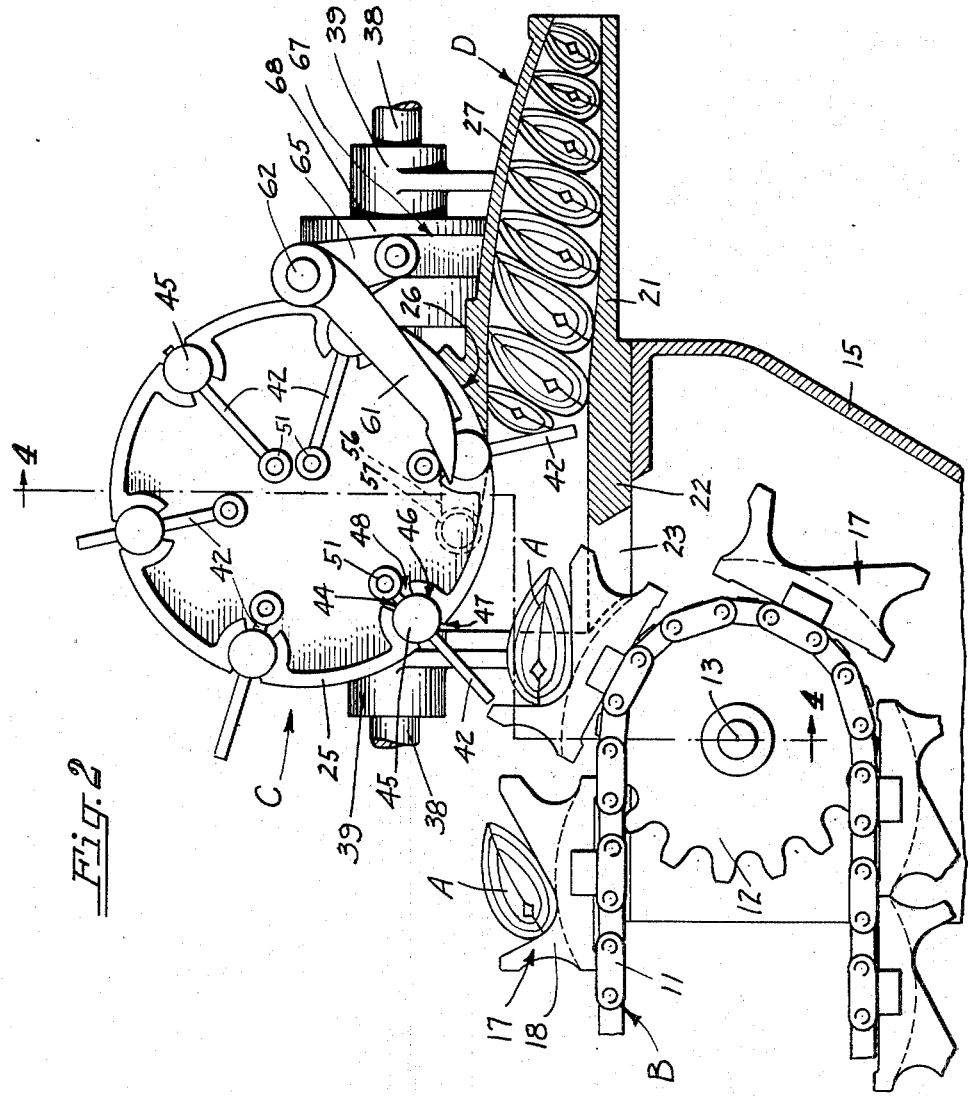

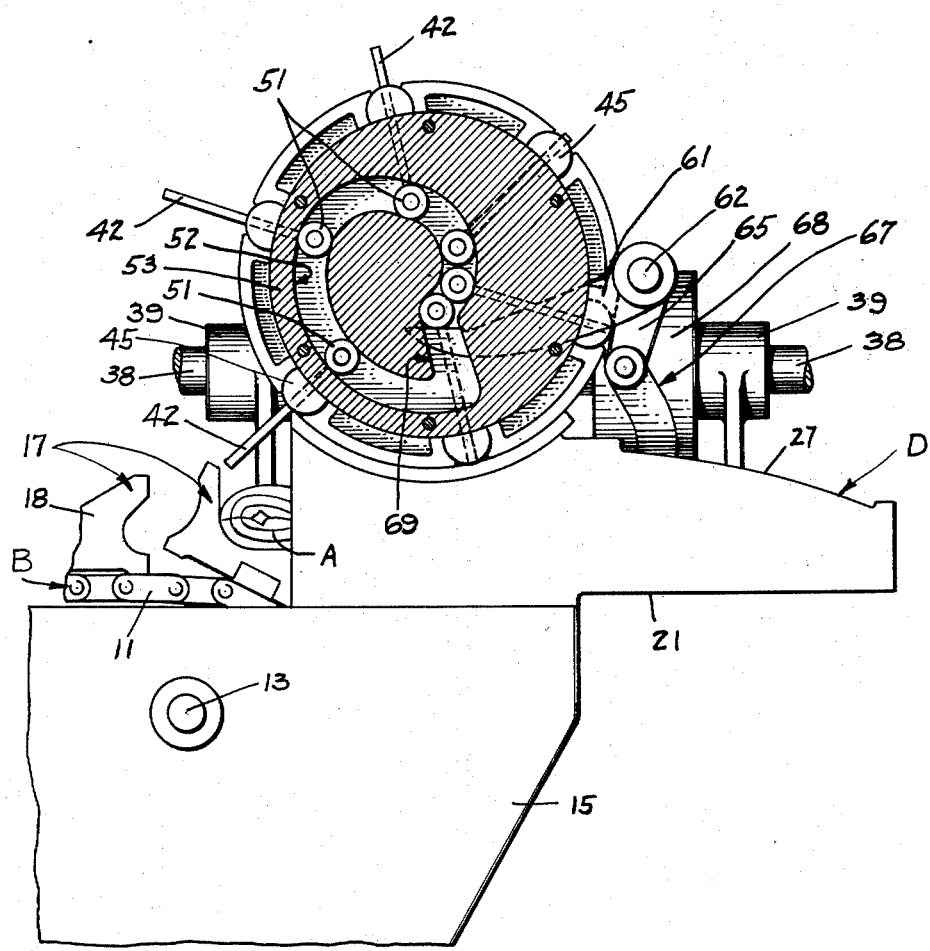

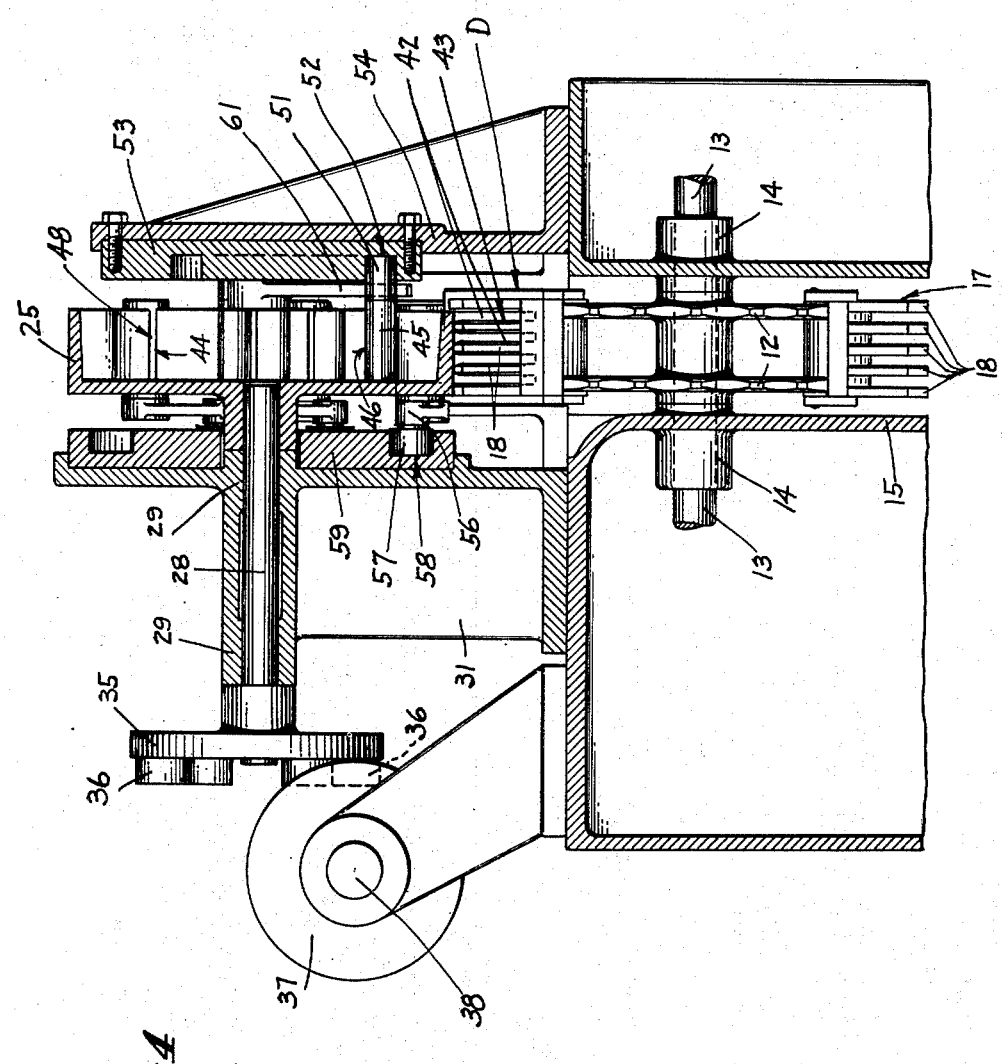

Patented Jan. 2, 1951

2,536,060

UNITED STATES PATENT OFFICE 2,536,060

FISH-CANNING MACHINE

John P. Jakob, Roselle, N. J., assignor to American Can Company, New York, N. Y., a corporation of New Jersey Application September 11, 1945, Serial No. 615,579

8 Claims. (Cl. 198—25)

The present invention relates to a fish canning machine and has particular reference to improved mechanism for collecting cut pieces of fish and compressing them into a uniform fish mass preparatory to canning.

An object of the invention is the provision in a fish canning machine of a discharge or delivery mechanism of an improved character wherein cut pieces of fish to be canned are collected and compressed into a uniform fish mass with rapid, sweeping motions and gentle action on the fish so that first grade packing with as little disturbance as possible to the cut pieces of fish may be effected at high speed rates of production.

Another object is the provision of such a delivery mechanism wherein the compressed pieces of fish are held in place after being collected so as to maintain the uniform character of the fish mass being prepared for canning.

Another object is the provision of such a delivery mechanism which is of a simple rotary construction having movable fish delivery paddles which may be shifted rapidly into and out of the path of travel of the fish pieces for rapidly and gently collecting the cut fish and for compressing them into the desired fish mass preparatory to canning.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a portion of a fish canning machine embodying the instant invention, with parts broken away;

Figs. 2 and 3 are longitudinal vertical sections taken substantially along the lines 2—2, 3—3, respectively, in Fig. 1, with parts broken away; and Fig. 4 is a transverse vertical section taken substantially along the broken line 4—4 in Fig. 2.

As a preferred embodiment of the instant invention the drawings illustrate an improved mechanism for discharging or delivering cut pieces of fish preparatory to canning into the forward or feed-in end of a fish canning machine of the type disclosed in United States Patent 2,226,019, issued December 24, 1940, to W. E. Rooney on Fish Canning Machine, principal parts of which are shown in the drawings.

In the machine, fish pieces A, previously cut to a desired length are fed or advanced into the machine on a continuously moving endless chain conveyor B, from which the discharge mechanism (marked C) delivers them into a stationary restraining supply tunnel D preparatory to canning the fish, as disclosed in United States Patent 2,189,831, issued February 13, 1940, to H. J. Paynter and W. E. Rooney on Fish Canning Machine.

The conveyor B includes a pair of horizontally spaced and parallel endless chains 11 (Figs. 1 and 2) which operate over a pair of spaced sprockets 12 mounted on a horizontal drive shaft 13 journaled in bearings 14 (see also Fig. 4) formed in a frame 15 which may constitute the main frame of the machine. The drive shaft 13 is rotated continuously in any suitable manner in time with the other moving parts of the machine. The chains 11 carry a plurality of buckets 17 spaced at intervals along their lengths for carrying individual cut pieces of the fish A into the machine. These buckets are made up of a plurality of horizontally spaced and parallel plates 18 which are disposed on edge and which are tied together to provide a unitary structure.

The fish buckets 17 on the constantly moving conveyor B carry the cut pieces of fish A toward the entrance end of the supply tunnel D which is in alignment with and adjacent the conveyor sprockets 12. The supply tunnel is formed with a floor 21 which is secured to the frame 15. Adjacent the entrance end of the tunnel, the floor extends toward the conveyor B and projects into the path of travel of the fish buckets 17. This extension (marked 22) of the tunnel floor is formed with longitudinal clearance slots 23 for the passage therethrough of the plates 18 of the buckets as the latter pass around the conveyor sprockets 12, as best shown in Fig. 2.

Hence as the fish buckets 17 pass around the conveyor sprockets 12, the pieces of fish carried in the buckets are deposited on the floor extension 22 of the tunnel D adjacent the entrance end of the tunnel. As each piece of fish is received on the tunnel floor extension and while it is still moving forward under the influence of its bucket 17, it is immediately swept forward, rapidly but gently by the discharge or delivery mechanism C, into the tunnel D where it is compressed against other previously fed fish pieces already in the tunnel. This provides a uniform fish mass which serves as the supply from which the fish is taken in measured charges for packing into cans, as disclosed in the above mentioned Paynter and Rooney patent.

This discharge or delivery mechanism C is disposed adjacent the entrance end of the supply tunnel D and includes a vertically disposed rotatable drum 25, the outer periphery of which slides in a seat 26 located adjacent the entrance end of the tunnel and which is formed in a ceiling 27 of the tunnel. The drum is mounted on the inner end of a horizontal drum shaft 28 which is carried in spaced bearings 29 formed in a bracket 31 bolted to the top of the main frame 15.

The drum 25 is intermittently rotated through partial rotation in time with the reception of the fish pieces on the tunnel floor extension 22. For this purpose the outer end of the drum shaft 28 carries an indexing disc 35 (Figs. 1 and 4) having a plurality of cam rollers 36 mounted thereon disposed in a circle substantially concentric with the shaft and in spaced relation in accordance with the desired partial rotation of the drum. In the instant mechanism there are disclosed six such cam rollers and they are individually engageable in succession with a continuously rotating indexing cam 37. This is a conventional indexing device.

The indexing cam 37 is mounted on a longitudinally disposed cam shaft 38 which is journaled in a pair of spaced bearing brackets 39 bolted to the top of the main frame 15. The shaft is rotated in any suitable manner in time with the travel of the conveyor B.

Delivery of the fish pieces A into the tunnel D, as the drum 25 rotates, is effected by a plurality of forks or slotted paddles 42 which are formed with clearance slots 43 which move between and which clear the plates 18 of the buckets 17 on the conveyor B. There are six of these paddles, one for each indexing roller 36 on the indexing disc 35. Each paddle is slightly narrower than the width of the tunnel D at its entrance end and is long enough to just clear the floor of the tunnel.

Each paddle 42 extends transversely of the drum 25 and is disposed in a slot 44 (Fig. 1) formed in a cylindrical swivel or rocker member 45. There are or may be six swivel members located in spaced relation around the periphery of the drum and disposed in cylindrical seats 46 (Fig. 2) formed in the drum. The outer ends of the paddles normally extend beyond the periphery of the drum through a clearance slot 47 formed in the seats.

The inner ends of the paddles 42 project through a clearance opening 48 in the seats 46 and respectively carry a cam roller 51 which operates in a cam groove 52 (see Figs. 3 and 4) of a stationary guide cam 53 secured to a bracket 54 bolted to the frame 15 adjacent the drum 25.

Hence as the drum 25 rotates through a partial rotation, as a fish piece A is deposited on the tunnel floor extension 22, the rotating drum brings one of the paddles 42 into position behind and engages the fish piece and carries or propels it forwardly rapidly and gently along the tunnel floor extension 22. Thus the fish piece is delivered into the entrance end of the tunnel and is compressed against the other fish pieces already therein, as hereinbefore mentioned. During this partial rotation of the drum, the travel of the paddle is accelerated to carry the fish piece away from its bucket 17 so that there will be no interference between the fish and the bucket.

Acceleration of the paddle 42 is brought about by a cam lever 56 (Figs. 1, 2 and 4) there being one lever on the outer end of each of the cylindrical swivels 45. The levers carry cam rollers 57 which operate in a cam groove 58 of a stationary cam 59 disposed adjacent the drum 25 and secured to the drum bracket 31. The rollers traverse the cam groove with the rotation of the drum and the cam groove is shaped to rock the cam levers 56 slightly at the proper position of the drum. Hence the paddle is rocked in the seat clearance openings 47, 48 and this pushes the fish piece A ahead at a slightly increased speed while it is advancing toward the tunnel D.

Rotation of the drum 25 ceases when the engaged fish piece A is fully within the tunnel, the paddle 42 remaining in position in the entrance end of the tunnel, as shown in Fig. 2, thus substantially sealing the tunnel so that the newly delivered fish piece is held in its compressed position. The drum and the paddle under consideration remain stationary until the next fish piece A in line on the conveyor B is about to be deposited on the tunnel floor extension 22 for delivery into the tunnel.

As the next following fish piece A is brought into position for delivery into the tunnel and just before the drum 25 begins to rotate through another partial rotation, the paddle 42 in the entrance end of the tunnel is quickly withdrawn so as to be clear of the tunnel ceiling when the drum begins to rotate. This withdrawal of the paddle 42 is effected by a lever 61 which is disposed between the drum and the guide cam 53.

The inner end of the lever 61 extends into the path of travel of the paddle cam rollers 51 and projects under the cam roller 51 of the paddle 42 coming or moving into the entrance end of the tunnel. The outer end of the lever is mounted on a cross shaft 62 which is journaled in a bearing 63 on the bracket 54 and in a bearing 64 on the bracket 31. The shaft carries a cam arm 65 having a cam roller 66 (Fig. 1) which operates in a cam groove 67 in a barrel cam 68 fixedly mounted on the continuously rotating cam shaft 38.

The cam groove 67 in the barrel cam 68 is shaped to rock the shaft 62 just prior to the indexing of the drum 25. Such rocking lifts the lever 61. This upward movement of the lever raises the cam roller 51 and the attached paddle 42 in the entrance end of the tunnel D and thus completely removes the paddle from the tunnel in one clean rapid sweep. A clearance groove section 69 (Fig. 3) in the cam groove 52 of the guide cam 53 provides for this quick removal of the paddle from the tunnel.

The raised lever 61 holds the withdrawing paddle 42 in its elevated position until the drum 25 has moved through its next partial rotation far enough to shift the lever supported paddle cam roller 51 out of the cam clearance groove section 69 and into the connecting guide or cam groove 52 (see Fig. 3). The lever 61 is then quickly returned, through the action of the barrel cam 68, to its original lowered position. This return of the lever is effected before the cam roller 51 of the next paddle 42 enters the tunnel D so that the lever will be in position to engage under the cam roller when it comes to rest at the end of its partial rotation with the drum.

During successive subsequent partial rotations of the drum 25, the cam rollers 51 upon being returned to their guide or cam groove 52, after withdrawal of their paddles from the tunnel D, traverse the guide groove and thus push their paddles outwardly beyond the periphery of the drum to their normally extended positions in readiness to engage and deliver another or succeeding fish piece A into the tunnel D (as explained above) when a said paddle is advanced to adjacent the conveyor B. This completes the cycle of operation of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a supply tunnel for fish storage, a rotatable drum disposed adjacent the entrance end of said tunnel, means for intermittently rotating said drum, a fish feeding paddle slidably mounted in said drum and normally extending radially beyond the periphery of the drum for delivering cut pieces of fish into the entrance end of said tunnel, and means for slidably withdrawing said paddle into and radially of said drum to clear said tunnel after movement of the paddle past said tunnel by said intermittently rotating drum.

2. In a fish canning machine, the combination of a supply tunnel for fish storage, a drum disposed adjacent the entrance end of said tunnel and intermittently rotatable in the same direction, a fish feeding paddle mounted in said drum and normally extending beyond its periphery for delivering cut pieces of fish into the entrance end of said tunnel during a partial rotation of said drum, said paddle remaining stationary in the entrance end of said tunnel to hold the inserted fish piece in place while the drum is at rest between its partial rotations, and means for withdrawing said paddle into said drum while the drum is at rest to clear said tunnel during a following partial rotation of said drum in the same direction.

3. In a fish canning machine, the combination of a supply tunnel for fish storage, a rotatable drum disposed adjacent the entrance end of said tunnel and intermittently rotatable in the same direction, a plurality of fish feeding paddles mounted in spaced relation in said drum and normally extending beyond is periphery for successively delivering cut pieces of fish into the entrance end of said tunnel during partial rotations of said drum, a said paddle remaining stationary in the entrance end of said tunnel to hold the inserted fish piece in place while the drum is at rest between its partial rotations, and means for rapidly withdrawing said paddle into said drum while the drum is at rest to clear said tunnel during a following partial rotation of said drum in the same direction.

4. In a fish canning machine, the combination of a supply tunnel for fish storage, a drum disposed adjacent the entrance end of said tunnel and intermittently rotatable in the same direction, a fish feeding paddle mounted in said drum and normally extending beyond its periphery for delivering cut pieces of fish into the entrance end of said tunnel during a partial rotation of said drum, said paddle remaining stationary in the entrance end of said tunnel to hold the inserted fish piece in place while the drum is at rest between its partial rotations, means for rapidly withdrawing said paddle into said drum while the drum is at rest to clear said tunnel during a following partial rotation of said drum in the same direction, and means for returning said paddle to its normal extended position beyond the periphery of said drum for a subsequent fish delivery operation.

5. In a fish canning machine, the combination of a supply tunnel for fish storage, a drum disposed adjacent the entrance end of said tunnel and intermittently rotatable in the same direction, a plurality of fish feeding paddles mounted in spaced relation in said drum and normally extending beyond its periphery for successively delivering cut pieces of fish into the entrance end of said tunnel during partial rotations of said drum, a said paddle remaining stationary in the entrance end of said tunnel to hold the inserted fish piece in place while the drum is at rest between its partial rotations, means for rapidly withdrawing said paddle into said drum while the drum is at rest to clear said tunnel during a following partial rotation of said drum in the same direction, and cam means for returning the withdrawn paddles during subsequent partial rotations of said drum to their normal extended positions beyond the periphery of said drum for subsequent fish delivery operations.

6. In a fish canning machine, the combination of a supply tunnel for fish storage, a rotatable drum disposed adjacent the entrance end of said tunnel, means for intermittently rotating said drum in one direction, a fish feeding paddle slidably mounted in said drum and normally extending radially beyond the periphery of said drum for delivering cut pieces of fish into the entrance end of said tunnel, means for accelerating the delivery movement of said paddle during rotation of the drum to expedite the delivery of the fish piece into said tunnel, and means for slidably withdrawing said paddle into and radially of said drum when the latter is stationary to clear said tunnel after movement of the paddle past said tunnel by said drum.

7. In a fish canning machine, the combination of a supply tunnel for fish storage, a rotatable drum disposed adajcent the entrance end of said tunnel, means for intermittently rotating said drum, a rocker member mounted in said drum, a fish feeding paddle slidably mounted in said rocker member and normally extending radially beyond the periphery of said drum for delivering cut pieces of fish into the entrance end of said tunnel, means for oscillating said rocker member during the intermittent rotation of said drum to accelerate the delivery action of said paddle while delivering a fish piece into said tunnel, and means for slidably moving said paddle in said rocker member when said drum is stationary to move the paddle clear of said tunnel after delivery of a fish piece thereto, said paddle moving means being further operative for returning the paddle to operable extended position for a subsequent fish delivery operation.

8. In a fish canning machine, the combination of a supply tunnel for fish storage, a carrier for advancing fish to a position adjacent the entrance end of said tunnel, an intermittently rotatable drum disposed adjacent the entrance end of said tunnel, a seat for said drum in a wall of said tunnel, a plurality of rocker members disposed in spaced relation in said drum adjacent its outer periphery, a fish feeding paddle slidably mounted in each of said rocker members, cam means disposed adjacent said drum for pushing a said paddle outwardly beyond the outer periphery of the drum as the drum rotates and as it approaches the entrance of the tunnel to engage behind a fish delivered by said carrier and to push it into said tunnel, auxiliary cam means for rocking the rocker member of the projected paddle to accelerate the pushing action of the paddle, and lever means engageable with the paddle for shifting it inwardly within the outer periphery of the drum to clear said tunnel as the drum continues to rotate.

JOHN P. JAKOB.

REFERENCES CITED

The following references are of record in the file of this patent:

UNITED STATES PATENTS

| Number | Name | Date |
|---|---|---|
| 1,863,474 | Curtis | June 14, 1932 |
| 1,974,931 | Rose | Sept. 25, 1934 |
| 2,007,981 | Nordquist | July 16, 1935 |
| 2,037,724 | Jacobs et al. | Apr. 21, 1936 |
| 2,320,307 | Saville | May 25, 1943 |
| 2,359,422 | Jeffrey | Oct. 3, 1944 |
| 2,362,132 | Haub | Nov. 7, 1944 |